United States Patent
Dombroski et al.

(10) Patent No.: US 7,740,036 B2
(45) Date of Patent: Jun. 22, 2010

(54) PRESSURIZED WHEEL HUB SYSTEM

(75) Inventors: Henry Dombroski, Boynton Beach, FL (US); Anthony Cunningham, Tequesta, FL (US)

(73) Assignee: Air Tight, LLC, Tequesta, FL (US)

( * ) Notice: Subject to any disclaimer, the term of this patent is extended or adjusted under 35 U.S.C. 154(b) by 350 days.

(21) Appl. No.: 11/735,131

(22) Filed: Apr. 13, 2007

(65) Prior Publication Data
US 2007/0182241 A1 Aug. 9, 2007

Related U.S. Application Data

(63) Continuation-in-part of application No. 10/699,565, filed on Oct. 30, 2003, now Pat. No. 7,226,133, which is a continuation-in-part of application No. 10/376,756, filed on Feb. 28, 2003, now Pat. No. 7,125,084.

(51) Int. Cl.
*B60C 23/10* (2006.01)
*B60B 27/00* (2006.01)

(52) U.S. Cl. .................... 152/416; 301/108.1
(58) Field of Classification Search ......... 152/415–417; 301/105.1, 108.1–108.5; 384/189, 190.6, 384/190.7
See application file for complete search history.

(56) References Cited

U.S. PATENT DOCUMENTS

| | | | |
|---|---|---|---|
| 3,064,982 A | 11/1962 | Stephens | |
| 3,169,809 A | 2/1965 | Pendleton | |
| 3,226,162 A | 12/1965 | Eberle | |
| 3,460,874 A | 8/1969 | Johnson | |
| 3,785,706 A | 1/1974 | Vangalis | |
| 4,027,743 A | 6/1977 | Deller et al. | |
| 4,190,133 A | 2/1980 | Ploeger | |
| 4,262,978 A | 4/1981 | Everett | |
| 4,489,988 A | 12/1984 | Robbins | |
| 4,557,526 A | 12/1985 | Smith | |
| 4,730,656 A | 3/1988 | Goodell et al. | |
| 4,924,697 A | 5/1990 | Hunt et al. | |
| 5,054,511 A | 10/1991 | Tuan et al. | |
| 5,098,168 A | 3/1992 | Johnson | |
| 5,203,391 A | 4/1993 | Fox | |
| 5,221,381 A | 6/1993 | Hurrell, II | |
| 5,236,028 A | 8/1993 | Goodell et al. | |
| 5,287,906 A * | 2/1994 | Stech | 152/417 |
| 5,429,167 A | 7/1995 | Jensen | |
| 5,535,516 A | 7/1996 | Goodell et al. | |
| 6,260,595 B1 | 7/2001 | Cobb | |
| 6,325,123 B1 | 12/2001 | Gao et al. | |
| 6,325,463 B1 | 12/2001 | Sitter et al. | |
| 6,795,753 B2 * | 9/2004 | Vanderhoof et al. | 700/301 |
| 7,125,084 B2 * | 10/2006 | Dombrowski et al. | 301/108.1 |
| 7,226,133 B2 * | 6/2007 | Dombroski et al. | 301/108.1 |

* cited by examiner

*Primary Examiner*—Jason R Bellinger
(74) *Attorney, Agent, or Firm*—McHale & Slavin, P.A.

(57) ABSTRACT

A system for pressurizing wheel hub formed from an air-tight sealing arrangement located on each end of a wheel hub to form a closed air system in the interior of the wheel hub. The closed air system fluidly coupled to a DC power air compressor or pressurized air tank for receiving pressurized air. A pressure gauge provides a visual indication of the air pressure in the closed air system whereby a breached seal condition within the wheel hub can be detected.

14 Claims, 3 Drawing Sheets

PRESSURIZED WHEEL HUB SYSTEM

RELATED APPLICATION

This application is a continuation-in-part of patent application 10/699,565 filed Oct. 30, 2003, now U.S. Pat. No. 7,226,133, issued Jun. 5, 2007, which is a continuation-in-part of patent application Ser. No. 10/376,756, filed Feb. 28, 2003, now U.S. Pat. No. 7,125,084, issued Oct. 28, 2006, the contents of these applications are incorporated herein by reference.

FIELD OF THE INVENTION

This invention is related to the field of wheel hubs and, in particular, to a system that permits the pressurization of a wheel hub to indicate hub seal integrity.

BACKGROUND OF THE INVENTION

The instant invention is directed to the use of pressurized wheel hubs. By way of background, a conventional boat trailer utilizes a fixed axle secured to a trailer frame. A wheel assembly is coupled to the axle by use of a wheel hub. The wheel hub employs a bearing assembly to allow free rotation of the hub in relation to the axle. Thus, the wheel assembly, which includes the tire, permits transportation of the boat trailer over a road when trailered by an automobile. The conventional wheel hub employs bearings, namely an inner and outer bearings with an associated inner and outer race, which permits rotational movement in relation to the axle.

As with any friction producing components, it is imperative that the bearings are lubricated in order to prevent premature wear. Typically, bearing grease is used which liquefies during bearing rotation for use in lubricating the bearings. The grease is sealed within the hub by use of an oil seal positioned along an inner side surface of the hub, and a bearing cap positioned along an outer side surface of the hub. The seals are used to prevent liquified grease from escaping the hub joint.

Thus the integrity of the oil seal and hub cover is critical to prevent loss of grease. Absence of a lubricant can quickly lead to catastrophic failure of the bearings causing hub disengagement of the axle, which can result in wheel assembly loss and the associated dangerous scenario of property and possibly life endangerment. For instance, a trailer carrying a heavy load such as a 25 foot boat, will quickly heat up a bearing that is not properly lubricated. Should the bearing fail, the bearing and race will typically disintegrate with a likely result of the hub and wheel detaching from the axle of the trailer. Boat trailers present an excellent example of premature wear as a boat trailer is typically inserted into water for loading or unloading of the boat. Should there be a failure of the hub seal, water is allowed to enter the hub resulting in the premature wear. In addition, should the water be saltwater, bearing disintegration is greatly enhanced since rust forming on the bearing surfaces will operate to destroy the bearings with very short use.

In light of the above numerous attempts have been made in order to prevent loss of bearing lubricant Many prior art wheel hub devices maintain pressurized grease within the hub. A very successful system consists of a modified hub cap having a grease fitting with a spring which visually indicates that grease has been inserted into the hub. However, should the hub seal fail, the assembly will actually facilitate grease being pushed through the seal. Should the spring jam, even if the bearing indicator illustrate that grease is prevalent in the seal, it may be providing a false indication. In addition, a slow leak will allow grease to be inserted into the hub and upon liquification during operation the seal could allow the liquified grease to easily escape.

Unfortunately, a spring loaded system to pressurize grease into the hub results in an excess amount of grease injected into the hub for proper operation. This results in an obvious waste of grease for only the bearing rollers must be lubricated. Thus, the amount of grease necessary is simply a coating over the bearing rollers. The spring loaded system advocates that should a seal leak, the user need simply pump more grease into the wheel hub on a continuous basis. Of course, the grease continues to leak from the wheel hub because the breach in the seal remains. For instance, a person may check a hub and insert grease into the hub before taking the trailer on the road. Once the trailer reaches operating speed, the liquified grease may easily escape. Should the operator back trailer into a lake, for purposes of unloading a boat, grease that has escaped from the hub and remains on the trailer will be exposed to the water.

The adverse environmental impact of petroleum product contamination of natural water environments is well known. The constant expulsion of grease into natural waters by the prior art bearing lubrication systems will have a cumulative negative impact on the environment. Should the water be a reservoir for drinking water, even a few drops of oil can result in system contamination. However, it is well known that any oil in water has an adverse effect to wildlife. The continued water pollution by leaking wheel hubs is unnecessary and preventable, and that there remains a need for an "environmentally friendly" system of bearing maintenance.

For this reason, the Applicants developed a pressurized wheel to provide a positive indication of hub and oil seal integrity to indicate availability of bearing grease within the hub and prevent the release of grease into the environment. The Applicants presented a wheel hub assembly capable of providing an air-tight seal for receipt of pressurized air from a vehicle mounted air compressor. The air-compressor provided a continual hub pressurization despite temperature fluctuations. A pressure gauge could be mounted anywhere along the pressurized system providing a visual indication of the internal pressure and seal integrity.

What is lacking in the art is a pressurization system that is designed specifically for use with pressurization hubs.

SUMMARY OF THE INVENTION

In light of the above, the Applicants propose a pressurization system for use with a pressurized wheel hub assembly capable of providing an air-tight seal. The pressurization system is based on an air-compressor, that may include an optional air tank, to provide a continual hub pressurization despite temperature fluctuations. A pressure gauge can be mounted anywhere along the pressurized system providing a visual indication of the internal pressure and seal integrity.

It is an objective of the instant invention to provide a pressurization system for indicating oil seal integrity for axle hub assemblies used on boats.

Another objective of the instant invention to provide a means for maintaining a predetermined amount of pressurized air in axle hub assemblies which is automatically adjusted despite large flucuations in temperature such as those found with a trailer is submersed in very warm or very cold water.

Still another objective of the instant invention is to provide an indicator for law enforcement that hub integrity is intact during trailer placement within a body of water thereby indicating a leaking hub that might otherwise be concealed by placement under the surface of the water.

Yet still another objective of the instant invention is to provide a positive pressure within the hub at all times to prevent the entrance of particles within the hub including water thereby preventing premature destruction of the wheel bearing assemblies.

In accordance with the above objectives, a pressurization system for wheel hubs is provided which comprises an air compressor having a pressure switch for use in series with a check valve to prevent back flow and a relief valve to prevent over-pressurization. The pressurization system is used in combination with a wheel hub having bearings that are rotatably securable to an axle; seals between the wheel hub and the axle, the seals forming a closed air space around the bearings. The pressurized wheel hub preferably includes a pressure gauge to determine the level of pressurized air placed within the wheel hub.

The wheel hub comprises a sealing arrangement that provides an air-tight sealing arrangement for the bearings of a wheel hub to form a closed air system in the interior of the wheel hub. An aperture is formed through the axle to provide an air flow connection with a remotely mounted air compressor used to pressurize the closed air space through the aperture. An air pressure gauge provides a visual indication of the level of air pressure in the closed air system whereby a breached seal condition within the wheel hub can be detected by the inability to maintain a pressurized system. The hub cap may also be used to provide a seal wherein the degradation of the hub bearing outer seal will not result in air loss or grease leakage.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
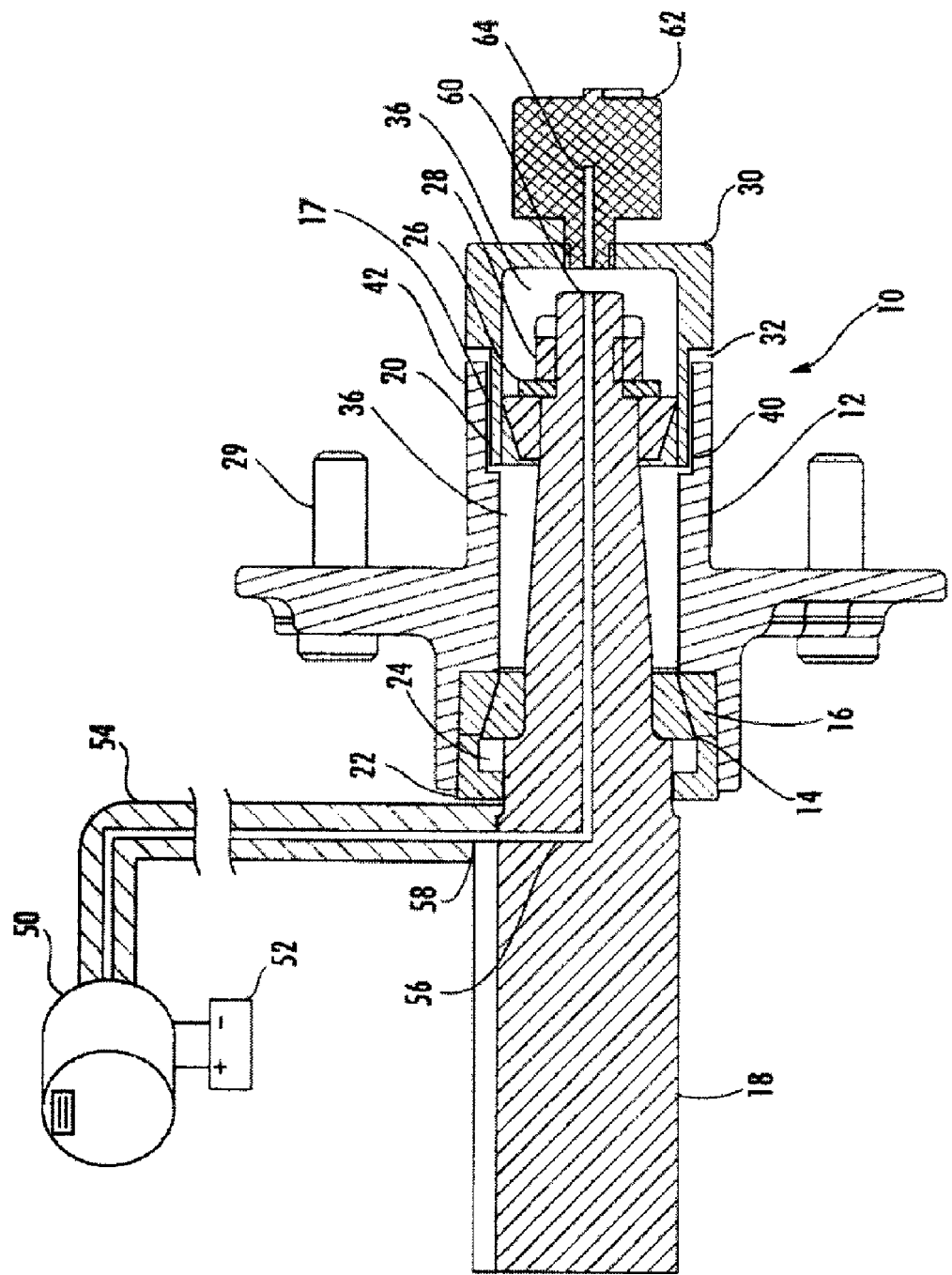
FIG. 1 is a cross-sectional view of the pressurized wheel hub shown mounted on an a trailer axle and coupled to an air compressor.

FIG. 1 is a cross-sectional side view of a wheel hub assembly 10 constructed from a hub 12 rotatably supported on inner bearing 14 operatively associated with inner bearing race 16, and outer bearing 17 operatively associated with outer bearing race 20. A modified oil seal 22 has a seal 24 capable of sealing air. The hub 12 is secured to the axle 18 by use of a washer 26 and nut 28 connection, wheel coupling bolts 29 are shown for reference. A cap 30, commonly referred to as a dust cap, includes a seal 32 capable of sealing air. The space between the cap 30 and the oil seal 24 forming a enclosure defined as the closed air space 36. The cap 30 has an annular shoulder 40 that frictionally engages a mating section 42 of the hub 12. The annular shoulder 40 includes a circumferential recess therein which receives a rubber O-ring 32 so that a fully air tight seal can be achieved, thus creating a closed air system within the wheel hub 12. The wheel hub 12 is pressurized by use of a small DC air compressor 50 that can be mounted on the trailer or the vehicle pulling the trailer. A battery 52 provides power to the air compressor 50. Preferable the air compressor 50 is mounted on the trailer in close proximity to the hub assembly wherein electrical power may be obtained through the trailer harness for connection to a car battery. To eliminate the need for additional wiring, the air compressor can be operated from the driving light circuit wherein the compressor would have power as long as the driving lights are operating on the towing vehicle. Similarly, the air compressor can be operated from the back-up light circuit wherein compressor operation is used only when the trailer is back-up, which is required for launching of a boat from the trailer.

The air compressor 50 is coupled to the axle by a pressure-proof hose 54. The axle 18 has a pneumatic chamber 56 annular coaxially disposed with an inlet 58 located outside of oil seal 22 and an outlet 60 exhausting into the closed air chamber 36. The air compressor 50 is capable of maintaining a predetermined pressure in the closed air space, typically between 1 psi and 30 psi. The actual pressure is determined by the type of seals to be employed since certain seal cannot handle the higher pressures. In the preferred embodiment, the air compressor will automatically compensate for differing loading characteristics which can change the pressure reading of the hub. For instance, if the hub is filled to 10 psi, operating the towing vehicle at highway speeds will have tendency to warm the air within the hub assembly and increase air pressure. Similarly, should the hub assembly be subjected to very cold temperatures, such as when the hub assembly is placed under water during the launching of a boat, the result will be a decrease in air pressure. This may cause a false reading to an unsuspecting law enforcement official when no lost of seal integrity has occurred, but the appearance of a reduction in air pressure would otherwise indicate such an event.

The cap 30 may include a pressure gauge 62 to provide a visual indicator of seal integrity. Obviously another visual indication of seal breach would occur when the wheel hub is submerged whereby the law official could easily determine wheel hub leakage due to air release and the resulting bubbling. An air gauge may also be remotely mounted by directly coupling into the air line 54. The use of a conventional air pressure gauge 62 in an air flow connection with the closed air system is operable to provide a visual indication of the air pressure within the wheel hub 12. The air pressure gauge 62 enables an observer to immediately detect a breached seal condition within the wheel hub by the resultant loss of air pressure within the wheel hub 12.

The air pressure gauge 62 can have a cup shaped housing having a conduit 64 extending therefrom providing a passage to the internal chamber of air pressure gauge. The air pressure gauge is of a conventional design, and includes a dial in the form of an annular disk having the standard numeric indicia thereon in the form of radial graduations. A pressure indicating needle moves relative to the annular disk in direct relation to the air pressure within the wheel hub. The disk can also include alphanumeric indicia specific to the function of the present invention corresponding to the position of pressure indicator needle. For example, the disk can indicate an optimum air pressure fill level, and can include color coded regions to alert observers that the seal has been breached. For instance, a gauge indicator could show green if the hub integrity is proper, or red is no pressure is available so as to indicate seal breach.

Figure 2:
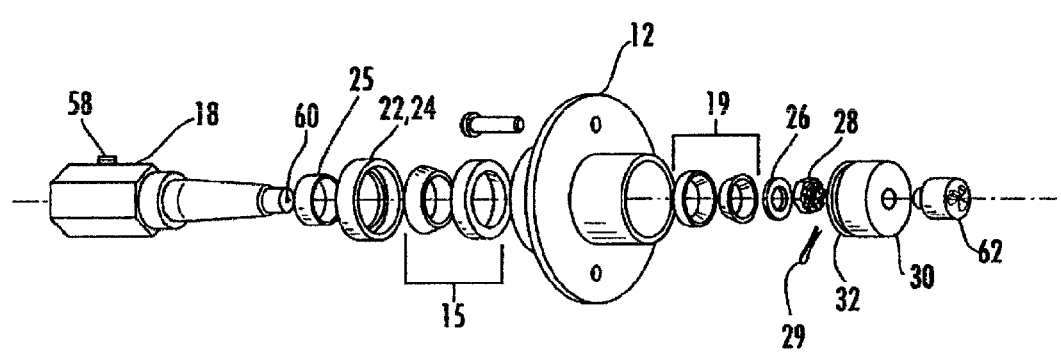
FIG. 2 is an exploded by of the pressurized wheel hub and axle assembly shown in FIG. 1.

FIG. 2 is an exploded illustration of the wheel hub 12 and wheel and axle 18. The axle 18 having the air inlet 58 and outlet 60. As is the conventional mode of assembly, the axle 18 is concentrically coupled to inner bearing assembly 15 and the outer bearing assembly. The sealing of the wheel hub is by use of the oil seal and gasket 22, 24 juxtaposition to the inner bearing assembly 15. The wheel hub 12 is releaseably fastened to the axle 18 by a washer 26, nut 28, and cotter pin 29. The cap 30 includes a seal 32 for providing an air tight seal along the outer bearing assembly. Pressure gauge 62 can be mounted to the cap 30 providing visual indication of seal integrity at the wheel hub. In order to provide an improved air tight seal at the point of connection of the inner bearing assembly and the axle, the system of the invention can further include the inclusion of a polished sleeve 25 which provides a smoother surface for the air seal. For instance, should an existing axle be reworked to accommodate the instant invention, the use of a sleeve can be sealingly secured to the axle to provide a smooth surface for the oil seal. The greatest wear problem for the oil seal is the poor surface preparation of the axle that results in premature failure of the oil seal. The use of a sleeve on used axles provides extended oil seal life. In addition, poor manufacturing of an axle can also be rectified by the sleeve.

The present invention advantageously allows the user (or a law enforcement official) to quickly visually inspect each trailer wheel to determine the integrity of the seals within the wheel hub. If the pressure is maintained within a wheel hub, the seals are sound, and the trailer wheels can be safely submerged without danger of water damage. When a loss in air pressure is observed, it is an indication that repairs to restore the integrity of the seals must be completed before the trailer can be used in water. While the prior art devices also provide a visual indication of broken seals, they do not require repairs in order to continue use of the trailer, but instead allow the user to temporality remedy the situation by pumping grease into the wheel hub to stop water penetration by maintaining the grease under pressure. Since the leak has not actually been repaired, the pressurized grease continues to be ejected into the water when the prior art devices are used. In contrast, the system of the present invention requires the repair of hub leaks, and does not continuously pollute the waters in which the trailer is deployed.

Figure 3:
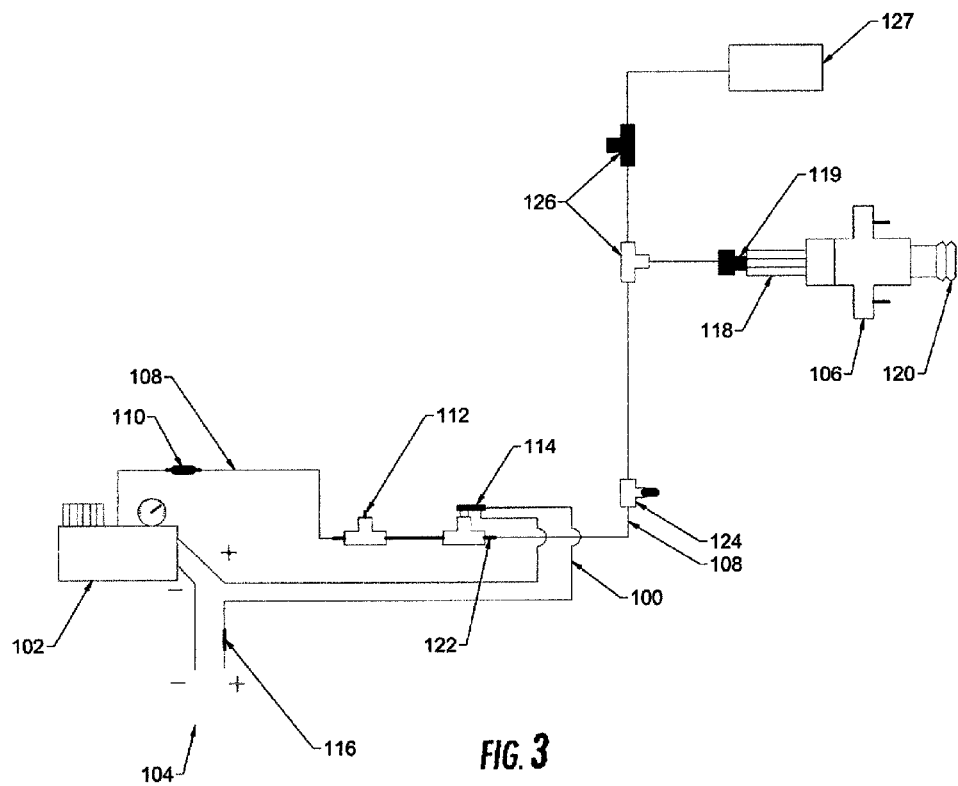
FIG. 3 is a flow diagram of an air-compressor based pressurization system.

Now referring to FIG. 3 set forth is flow diagram of the preferred pressurization system 100 for use with a pressurized wheel hub 106. The system 100 consists of a DC air compressor 102 that is electrically coupled to a 12VDC power source such as a conventional battery 104 used in the electrical system of a conventional towing vehicle. Pressurized air produced by the air compressor 102 is directed to pressurizable wheel hub 106 by use of polyethylene-tubing 108 or the like material. Polyethylene tubing having of ¼ inch is sufficient to handle the low pressure required for operation of the system and provide a material that can not be degraded despite the corrosive atmosphere created by the salt water environment.

Pressurized air is directed through a check valve 110 which prevents air from back flowing into the compressor. Over pressurization protection of the system including the interconnecting tubing is provided by the use of a relief valve 112 with a preferred embodiment having a pressure relief of 15 PSI. Pressure switch 114 is electrically coupled to a power source an is used to cause operation of the air compressor when pressure in the system falls below 7 pounds per square inch. The pressure switch 114 further causes a disengagement of the air compressor when the system pressure is 10 PSI or higher. The pressure switch 114 and air compressor include fuse protection 116 to address excess power draws.

Pressurized air is delivered to the wheel hub 106 through the axle 118 with a visual indicator provided by the pressure indicating diaphragm 120. In this embodiment, the connectors to each critical component is preferably a ¼"×¼" NPTF quick connect 122 which allows disengagement of critical components without tools. Pressurized air is delivered to the wheel hub 106 by the use of ¼" NPTF quick connects 119 to the axle 118 inlet allowing disengagement of to the axle input without the need for tools.

Shutoff valve 124 provides a manual isolation of system to prevent loss of air pressure when the air compressor is disconnected. For instance, if any electrical components are located on the boat trailer, the electrical harness is typically disconnected before the trailer is placed in the water. The use of a quick connect tee 126 allows coupling of the air flow to multiple wheels 127 and/or axles. For example, the air compressor 102 may be installed on a towing vehicle with a quick connect coupling the pressurize air to the boat trailer by use of flexible lines. Alternatively the pressure switch 114 may be placed on the boat trailer and electrically coupled to two vehicle mounted air compressor. Alternatively, the components including the air compressor, check valve 110, relief valve 112 and pressure switch 114 may be mounted on the vehicle with a quick connect used in combination with the shutoff valve 124 so as to allow disconnect of the pressurization system from the boat trailer when the trailer is uncoupled from the vehicle.

It should be noted that the air compressor may be factory installed, commonly found in luxury tow vehicles or the air compressor may be in aftermarket and sold as a kit. If the entire pressurization system is placed on a trailer, the only electrical connection to the trailer required would be access to a 12DCV source, which may be taken from the boat trailer harness.

Figure 4:
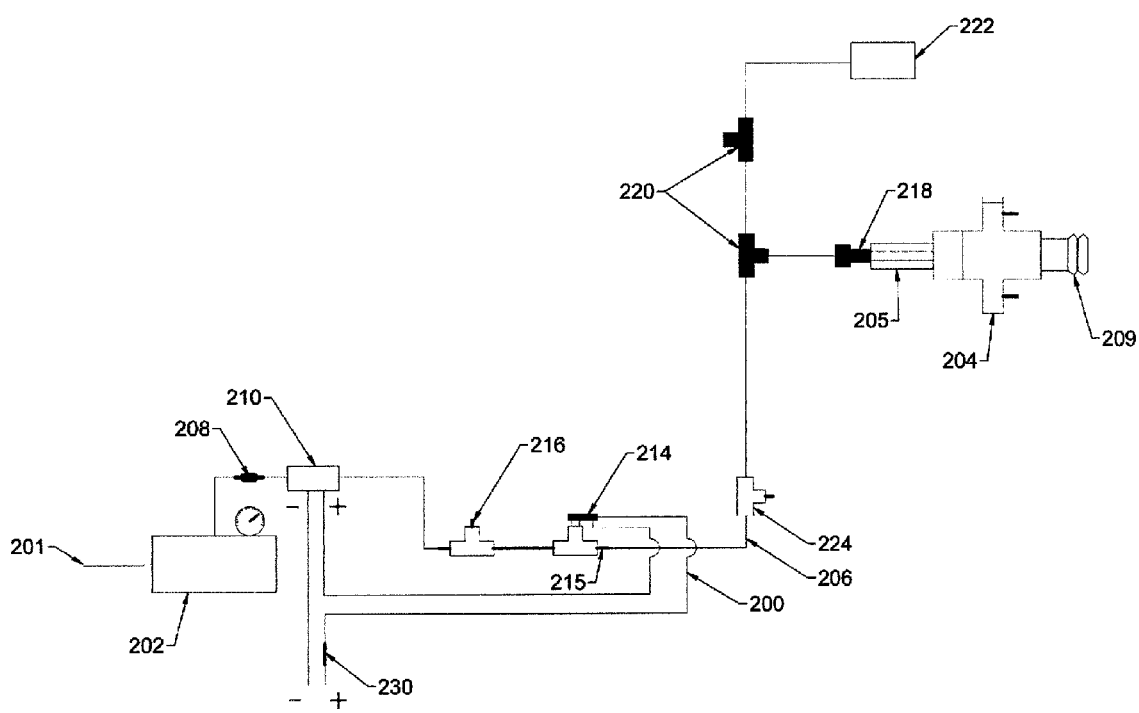
FIG. 4 is a flow diagram of an air tank based pressurization system.

FIG. 4 sets forth an alternative pressurization system embodiment 200 wherein an air tank 202 is employed thereby eliminating the need for an air compressor. In this embodiment, an air tank may be filled with compressed air with an external air compressor, such as those found at a gas station, not shown, or from a vehicle air supply 203. The air tank 202 is sized to accommodate the volume of air needed in a system together with any loss of pressure that may occur due to temperature variations. In operation, the air tank 202 will maintain a required operating pressure under normal operation. In this embodiment, an air tank provides an air flow to a wheel hub 204 by use of flexible tubing 206, preferably polyethylene, or the like tubing capable of withholding low pressures and maintaining flexibility. Pressurized air is delivered to the wheel hub 204 through the axle 205 with a visual indicator provided by the pressure indicating diaphragm 207.

The air tank 202 preferably includes an air regulator/filter valve 208 to lower the tank pressure to the system operating pressure, and trap contaminants. Pressurized air from the air tank 202, lowered to a nominal pressure below 10 psi is delivered through a normally closed solenoid valve 210 which operates in conjunction with the pressure switch 214. The pressure switch 214 opens the solenoid valve 210 when a pressure falls below 7 PSI. The pressure switch 214 closes the solenoid valve 210 when the pressure in the system reaches 10 PSI. Preferably the solenoid valve 210 is normally closed so as to prevent pressurization of the system unless power is available. As with the primary embodiment, a pressure relief valve 216 prevents over pressurization of the pressurized wheel hub 204, preferably set at 15 PSI.

Pressurized air is delivered through the system using the flexible tubing 206 and quick connectors to each critical component. Pressurized air is delivered to the wheel hub 204 through the axle 207 with a visual indicator provided by the pressure indicating diaphragm 209. By way of example, the pressure switch 214 may be used in a position for disconnection preferably with a ¼"×¼" NPTF quick connect 215 which allows disengagement without tools. Similarly, pressurized air is directed to the wheel hub 204 by the use of ¼" NPTF quick connects 218 that allow disengagement of the tubing 206 to the axle 205 input without the need for tools. Quick connect tees 220 further allow the addition of multiple wheels 222 such as those axles having independent axle inputs or in larger trailers having multiple axles. A shutoff valve 224 is used in servicing of any component, but also allows the air tank, solenoid valve 210, relief valve 216 and pressure switch 214 to be mounted on a vehicle and to be separated from the system by the flexible tubing wherein no electrical connections are necessary on the boat trailer. As previously mentioned, the air tank and all of the components may also be mounted on a trailer wherein the only electrical requirement is for power of the solenoid valve 210 which is coupled to a power source such as a 12V battery 226 which may be acquired by hooking into the harness of a trailer wherein power is provided through a conventional electrical hook up. Fuse 230 provides an electrical safety to prevent electrical shorting of the pressure switch or solenoid valve.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings. The instant invention can be used on automobile and truck axles including CV joints, or on any other coupling where integrity of the bearing housing is critical. It should be noted that proper seals prevents road grit or other contaminants from entering the bearing housing thereby enhancing bearing life.

What is claimed is:

1. A pressurized wheel hub system comprising: a compressor for producing pressurized air; a pressure switch for controlling said pressurized air; a check valve positioned between said compressor and said pressure switch to prevent pressurized air from flowing back into said compressor; a wheel hub having bearings that are rotatably securable to an axle; seals between said wheel hub and said axle, said seals forming a closed air space around said bearings; and a pneumatic chamber, which is coaxially disposed within said axle, having an inlet adapted for fluidly coupling to said pressurized air and an outlet coupled to said closed air space, said source of pressurized air maintaining between 1 psi and 30 psi in said closed air space.

2. A pressurized wheel hub system according to claim 1 wherein said pressure switch turns said compressor on when said pressurized air is less than about 7 psi.

3. A pressurized wheel hub system according to claim 1 wherein said pressure switch turns said compressor off when said pressurized air is greater than about 10 psi.

4. A pressurized wheel hub system according to claim 1 wherein said air compressor is located on a boat trailer.

5. A pressurized wheel hub system according to claim 1 wherein said air compressor is located on a towing vehicle.

6. A pressurized wheel hub system according to claim 1 including a manual shut-off valve positioned between said pressure switch and said wheel hub, said shut-off valve isolating said wheel hub in a pressurized state when said air compressor is disconnected.

7. A pressurized wheel hub system according to claim 1 including at least one quick connect to separate said wheel hub from said source of pressurized air without tools; wherein said closed air space of said wheel hub may be isolated from a continuous source of pressurized air.

8. A pressurized wheel hub system comprising: a air tank for storing pressurized air; a pressure switch for controlling said pressurized air; a normally closed solenoid valve positioned between said pressurized air; a wheel hub having bearings that are rotatably securable to a trailer axle; seals between said wheel hub and said axle, said seals forming a closed air space around said bearings; and a pneumatic chamber, which is coaxially disposed within said axle, having an inlet adapted for fluidly coupling to said source of pressurized air and an outlet coupled to said closed air space, and a normally closed solenoid valve positioned between said source of pressurize air and said closed air space; said source of pressurized air maintaining between 1 psi and 30 psi in said closed air space through the opening of said solenoid valve when said pressure switch is actuated.

9. A pressurized wheel hub system according to claim 5 wherein said pressure switch directs power to said normally closed solenoid valve for opening of said solenoid valve when said pressurized air is less than about 7 psi.

10. A pressurized wheel hub system according to claim 8 wherein said pressure disrupts power to said normally closed solenoid valve for closing of said solenoid valve when said pressurized air is greater than about 10 psi.

11. A pressurized wheel hub system according to claim 8 wherein said air tank is located on a boat trailer.

12. A pressurized wheel hub system according to claim 8 wherein said air tank is located on a towing vehicle.

13. A pressurized wheel hub system according to claim 8 including a manual shut-off valve positioned between said pressure switch and said wheel hub, said shut-off valve isolating said wheel hub in a pressurized state when said air tank is disconnected.

14. A pressurized wheel hub system according to claim 8 including at least one quick connect to separate said wheel hub from said source of pressurized air without tools; wherein said closed air space of said wheel hub may be disconnected from a continuous source of pressurized air.

* * * * *